Oct. 11, 1955 R. C. MASON 2,720,239
TIRE CROSS-CHAIN
Filed June 16, 1953
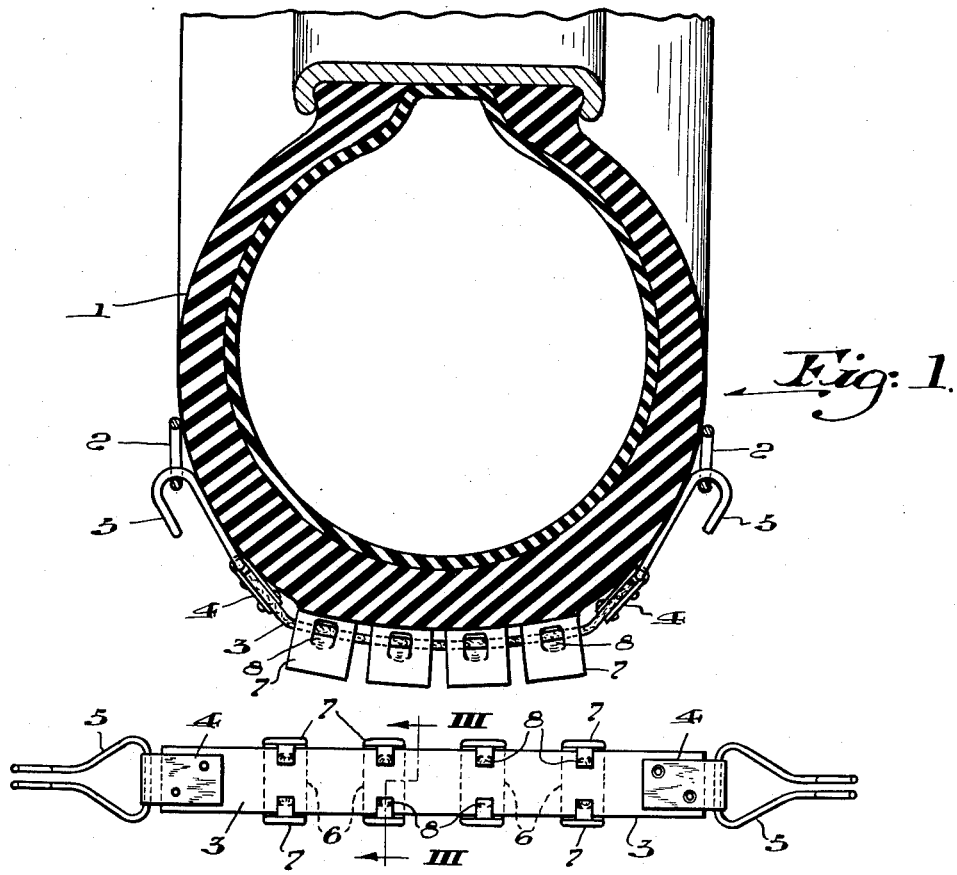
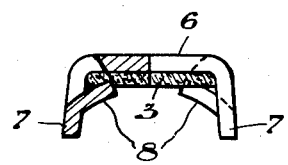
INVENTOR.
ROBERT C. MASON
BY
Brown, Critchlow, Flick & Peckham
his ATTORNEYS

United States Patent Office 2,720,239
Patented Oct. 11, 1955

2,720,239

TIRE CROSS-CHAIN

Robert C. Mason, Pittsburgh, Pa.

Application June 16, 1953, Serial No. 361,920

3 Claims. (Cl. 152—222)

This invention relates to anti-skid tire chains, and more particularly to their cross-chains.

The cross-chain disclosed herein is an improvement on the one disclosed in my Patent No. 2,424,478, wherein several tread elements formed from bent metal bars are clamped on a looped flexible wire cable that extends across a tire.

It is among the objects of this invention to provide a cross-chain having all of the advantages of the one disclosed in my patent and yet which is more durable and easier and less expensive to make.

In accordance with this invention a plurality of U-shape tread elements are mounted on a flexible strap that extends across a vehicle tire and has its opposite ends connected to circular side chains. Each of the tread elements has a substantially flat base that extends across the inner side of the strap between it and the tire. At opposite ends of the base the tread element is bent outwardly to form legs that project across the edges of the strap and beyond its outer side. The outer ends of these legs engage the roadway as the tire runs along it. To clamp the tread elements on the strap, rigid tongues are struck inwardly out of their legs and project part way across the outer side of the strap. The tongues press the strap tightly against the bases of the tread elements. Preferably, the strap is substantially as thin as the bars from which the tread elements are formed.

The preferred embodiment of the invention is illustrated in the accompanying drawings, in which:

Fig. 1 is a cross section of a motor vehicle tire on which an anti-skid chain using my cross-chains is mounted;

Fig. 2 is a view of the outer side of a single cross-chain laid out straight; and Fig. 3 is a transverse section through the cross-chain taken on the line III—III of Fig. 2.

Referring to the drawings, mounted on an automobile tire 1 is an anti-skid chain having side chain links 2, to which the opposite ends of spaced cross-chains are attached. Each of the cross chains of this invention includes a tough but rather thin flexible strap 3, preferably made of webbing impregnated with neoprene. Riveted to the opposite ends of the strap are metal clips 4, in which hooks 5 are pivoted. These hooks connect the strap to the links 2 at opposite sides of the tire.

Fastened to each flexible strap are several metal tread elements that are spaced apart far enough to permit them to accommodate themselves to the roadbed independently of one another. Each tread element is formed from a short rectangular metal bar of hard, wear-resisting steel bent into substantially U-shape. That is, each element has a body portion or base 6, from the opposite ends of which integral end portions or legs 7 extend laterally in the same general direction. The base, which preferably is flat, extends across the inner surface of the strap next to the tire. The legs of the tread element therefore extend past opposite edges of the strap and are long enough to project out beyond the outer surface of the strap a considerable distance to allow for wear. The strap fits snugly between the legs, which diverge to some extent to prevent snow and ice from packing between them. The outer ends of the legs are squared off to provide sharp edges and corners that aid in penetrating icy surfaces and gripping the roadway.

In order to fasten the tread elements securely to the strap, a tongue 8 is struck inwardly out of each leg 7 beyond the strap. The tongue remains attached to the leg beyond the strap, but the rest of the tongue projects part way across the outer surface of the strap. After the tread elements have been slipped onto the strap and correctly spaced, the tongues are bent toward the strap to press it tightly against the bases 6 of the tread elements. The free ends of the tongues thus become imbedded to some extent in the strap, and the tread elements are clamped onto it. The tongues are strong enough to hold their positions.

The flexibility of the strap enables the tread elements to conform to the tire and to the roadway. By using a strap that is nearly as thin as the tread element bases, the legs 7 can be made long enough to allow for a considerable amount of wear without making the overall thickness of the tread elements so great as to cause the tires to bump along the road in a disturbing manner. It will be seen that by using tongues or ribs with free inner ends, the tread elements and straps can be assembled quickly, and by automatic machinery if desired.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A cross-chain for anti-skid tire chains, comprising a flexible strap adapted to extend across a vehicle tire with the inner side of the strap adjacent the tire, and a plurality of U-shape metal tread elements mounted on the strap, each of said elements having a substantially flat base extending transversely across said inner side of the strap and also having outwardly bent end portions forming legs projecting across the edges of the strap and beyond its outer side, the outer ends of the legs being at least as far apart as their inner ends and adapted to engage a roadway, and rigid tongues integral with said legs projecting part way across said outer side of the strap and having their free ends in engagement therewith, said tongues pressing the strap tightly against the bases of the tread elements to clamp said elements on the strap.

2. A cross-chain for anti-skid tire chains, comprising a flexible strap adapted to extend across a vehicle tire with the inner side of the strap adjacent the tire, and a plurality of U-shape metal tread elements mounted on the strap, each of said elements having a substantially flat base extending transversely across said inner side of the strap and also having outwardly bent end portions forming outwardly diverging legs projecting across the edges of the strap and beyond its outer side, the outer ends of the legs being adapted to engage a roadway, the strap being substantially as thin as said base, and rigid struck-out tongues integral with said legs projecting part way across said outer side of the strap and having their free ends in engagement therewith, said tongues pressing into the strap to clamp the tread elements on the strap.

3. A cross-chain for anti-skid tire chains, comprising a flexible strap adapted to extend across a vehicle tire with the inner side of the strap adjacent the tire, and a plurality of U-shape metal tread elements mounted on the strap, each of said elements having a substantially flat base extending transversely across said inner side of the strap and also having outwardly bent end portions forming legs projecting across the edges of the strap and beyond its outer side, the outer ends of the legs being adapted to engage a roadway, and rigid struck-out tongues integral with said legs projecting part way across said outer side of the strap and having their free ends in engagement therewith, said tongues pressing the strap tightly against the bases of the tread elements to clamp said elements on the strap, and the tongues being bent inward from the legs and joined thereto between the strap and the outer ends of the legs.

References Cited in the file of this patent

UNITED STATES PATENTS

| | | |
|---|---|---|
| 984,499 | Stimpson | Feb. 14, 1911 |
| 1,856,915 | Irvin | May 3, 1932 |
| 2,082,386 | Fritts | June 1, 1937 |
| 2,424,478 | Mason | July 22, 1947 |

FOREIGN PATENTS

| | | |
|---|---|---|
| 95,615 | Sweden | May 2, 1939 |